United States Patent
Zelenay et al.

(10) Patent No.: US 6,696,382 B1
(45) Date of Patent: Feb. 24, 2004

(54) CATALYST INKS AND METHOD OF APPLICATION FOR DIRECT METHANOL FUEL CELLS

(75) Inventors: Piotr Zelenay, Los Alamos, NM (US); John Davey, Los Alamos, NM (US); Xiaoming Ren, Los Alamos, NM (US); Shimshon Gottesfeld, Los Alamos, NM (US); Sharon C. Thomas, Vancouver (CA)

(73) Assignee: The Regents of the University of California, Los Alamos, CA (US)

( * ) Notice: Subject to any disclaimer, the term of this patent is extended or adjusted under 35 U.S.C. 154(b) by 0 days.

(21) Appl. No.: 09/715,211

(22) Filed: Nov. 14, 2000

(51) Int. Cl.$^7$ .................. B01J 21/00; B01J 31/00; H01M 4/86; H01M 4/90
(52) U.S. Cl. .................. 502/168; 502/100; 429/40; 429/41; 429/42
(58) Field of Search .................. 429/40–42; 502/100, 502/168

(56) References Cited

U.S. PATENT DOCUMENTS

| | | | |
|---|---|---|---|
| 5,211,984 A | 5/1993 | Wilson | 427/115 |
| 5,234,777 A | 8/1993 | Wilson | 429/33 |
| 5,330,860 A | 7/1994 | Grot et al. | 429/42 |
| 5,415,888 A | 5/1995 | Banerjee et al. | 427/125 |
| 5,470,448 A * | 11/1995 | Molter et al. | 204/252 |
| 5,702,755 A * | 12/1997 | Mussell | 427/115 |
| 5,716,437 A | 2/1998 | Denton et al. | 106/31.92 |
| 5,766,788 A | 6/1998 | Inoue et al. | 429/42 |
| 5,843,519 A | 12/1998 | Tada | 427/115 |
| 5,861,222 A | 1/1999 | Fischer et al. | 429/42 |
| 5,869,416 A | 2/1999 | Mussell | 502/101 |
| 5,882,810 A * | 3/1999 | Mussell et al. | 429/33 |
| 5,992,008 A | 11/1999 | Kindler | 29/730 |
| 6,074,773 A * | 6/2000 | Wilkinson et al. | 429/41 |
| 6,187,467 B1 * | 2/2001 | Zhang et al. | 429/42 |
| 6,303,244 B1 * | 10/2001 | Surampudi et al. | 429/17 |
| 6,306,536 B1 * | 10/2001 | Wilkinson et al. | 429/33 |

* cited by examiner

Primary Examiner—Mark L. Bell
Assistant Examiner—Patricia L. Hailey
(74) Attorney, Agent, or Firm—Ray G. Wilson

(57) ABSTRACT

Inks are formulated for forming anode and cathode catalyst layers and applied to anode and cathode sides of a membrane for a direct methanol fuel cell. The inks comprise a Pt catalyst for the cathode and a Pt—Ru catalyst for the anode, purified water in an amount 4 to 20 times that of the catalyst by weight, and a perfluorosulfonic acid ionomer in an amount effective to provide an ionomer content in the anode and cathode surfaces of 20% to 80% by volume. The inks are prepared in a two-step process while cooling and agitating the solutions. The final solution is placed in a cooler and continuously agitated while spraying the solution over the anode or cathode surface of the membrane as determined by the catalyst content.

5 Claims, 3 Drawing Sheets

CATALYST INKS AND METHOD OF APPLICATION FOR DIRECT METHANOL FUEL CELLS

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to direct methanol fuel cells, and, more particularly, to catalysts for use with such fuel cells.

BACKGROUND OF THE INVENTION

Fuel cells are an evolving source of portable electrical energy that use electrochemical reactions to generate electricity from the oxidation of a fuel source. Most fuel cell development has been directed to the use of hydrogen as the fuel source and oxygen or air as the oxidizer. However, hydrogen is not widely available as a fuel and is difficult to store in portable devices.

Conventional hydrocarbon fuels, such as gasoline and methanol, have been considered as fuels for fuel cells, typically where such liquid fuels have been reformed into a gaseous fuel stream that includes hydrogen. Reforming systems are complex, however, and reformation processes typically generate some carbon monoxide, which acts to poison conventional catalysts for the hydrogen anode reaction occurring in fuel cells. Such systems can be accommodated, but only at the expense of system efficiency and additional complications.

There have been recent developments using methanol directly as the fuel source for a fuel cell, where the "exhaust" is water and carbon dioxide. Methanol is widely available in liquid form and can be readily transported and stored. Moreover, methanol has a much higher energy density than hydrogen gas, which is beneficial to many potential applications of fuel cells, including automotive transportation and portable electronics.

However, conventional approaches to direct methanol fuel cells (DMFCs) using hydrogen fuel cell technology provide low fuel utilization. In both methanol and hydrogen fuel cells, a catalyst, such as platinum-ruthenium (Pt—Ru) for the anode and Pt for the cathode, is provided in either a supported form, where the catalyst is deposited on a carbon carrier, or unsupported form. The catalyst is applied either directly to a fuel cell membrane, typically perfluorosulfonic acid ionomer, that acts as a proton conductor or to the side of a porous electrode that contacts the membrane. The electrochemical reactions then occur at the catalyst/perfluorosulfonic acid ionomer interface.

To provide improved performance, the catalyst needs to be uniformly distributed over the membrane or gas-diffusion electrode (backing) surface and to provide a maximum surface area for contacting all the reactants. Further, the amount of catalyst (the "loading") should be minimized since the catalysts are precious metals, which are costly and relatively scarce. Prior art developments have not effectively addressed these issues.

Various aspects of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes homogenous suspensions (mixtures, inks) for forming anode and cathode catalysts for application to anode and cathode surfaces of a membrane for a direct methanol fuel cell. The inks comprise an unsupported or carbon-supported Pt catalyst for the cathode and an unsupported or carbon-supported Pt—Ru catalyst for the anode, purified water in an amount 4 to 20 times that of the catalyst by weight, and a dissolved perfluorosulfonic acid ionomer in an amount effective to provide an ionomer content in the anode and cathode catalyst layers of 20% to 80% by volume.

In another characterization of the present invention, inks are formed for use in anode and cathode catalysts for a direct methanol fuel cell. A catalyst selected from the group consisting of Pt and Pt—Ru unsupported or supported catalysts is mixed with purified water to form a first mixture. The first mixture is cooled to reduce evaporation of water and agitated to obtain a homogeneous suspension. A solution of perfluorosulfonic acid ionomer in alcohols is then added to the first mixture to provide a second mixture. The second mixture is agitated in the cooler to obtain a homogeneous ink suitable for application to the appropriate anode or cathode side of the membrane.

In yet another characterization of the present invention, anode and cathode inks are applied to anode and cathode sides of a membrane for a direct methanol fuel cell. An ink is formed of water, perfluorosulfonic acid ionomer, alcohols, and catalyst of unsupported or carbon-supported Pt—Ru for the anode or unsupported or carbon-supported Pt catalyst for the cathode while cooling and agitating the ink. The ink is placed in a cooler and continuously agitated while spraying the ink over the anode or cathode side of the membrane, anode or cathode conductive backings, or onto anode and cathode decal blanks.

BRIEF DESCRIPTION OF THE DRAWINGS

The accompanying drawings, which are incorporated in and form a part of the specification, illustrate embodiment of the present invention and, together with the description, serve to explain the principles of the invention. In the drawings.

DETAILED DESCRIPTION

Figure 1:
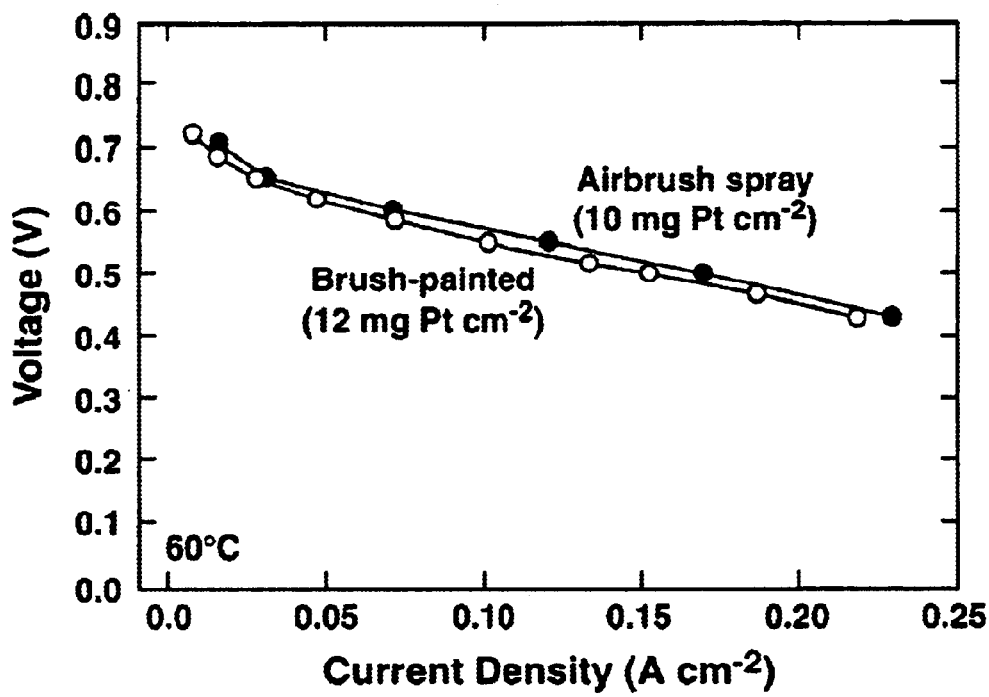
FIG. 1 graphically depicts cell polarization of an airbrush sprayed MEA and one of the best brush-painted MEAs at high total Pt loading.

A method for fabrication of catalyzed ionomeric membranes has been developed, specifically intended for use in direct-methanol fuel cells (DMFCs). The method involves preparation of highly optimized mixtures of anode and cathode catalyst mixtures ("inks" herein) of unique formulation, together with techniques for their application to the membrane. As indicated by test data, the resulting membrane-electrode assemblies (MEAs) provide excellent DMFC performance.

Preparation of DMFC Catalysts

Anode Catalyst

Anode ink is prepared by thorough blending of an unsupported or supported Pt—Ru catalyst powder (from Johnson Matthey, E-Tek, Degussa, TKK or in-house made), with water and alcohol solution of perfluorosulfonic acid ionomer. The composition of Pt—Ru catalysts is in an atomic Pt:Ru ratio range of 4:6 to 6:4, and preferably about 1:1. Samples with the Pt:Ru ratio as high as 7:3 atomic ratio were also investigated but found not to perform as well. Examples of suitable ionomers include Nafion® (DuPont), Flemion® and Aciplex® (Asahi), experimental XUS ionomer (Dow Chemical), and the like.

A typical procedure for the preparation of anode inks involves two stages. First, a required amount of a catalyst is combined with purified water (deionized and/or distilled and/or treated by other means, e.g., in a Millipore water purification system) in a range of 4–20 times that of the catalyst (by weight) and agitated in a cooler for 2–30 minutes until a homogenous suspension is obtained. Cooling may be obtained from a refrigeration unit and the like, an ice bath, or other immersion unit, that reduces evaporation from the solution without freezing the solution. Agitation may be obtained by a mechanical shaker, stirrer, ultrasound, and the like. A spray application of the ink requires a ratio of water to catalyst in the high end of the range. The agitation time is related to some degree to the individual properties of the catalyst used, with a 10-minute time sufficient in most cases where ultrasonic agitation (sonication) is used, and can be readily determined with routine experimentation.

In the second stage, a 5% (wt) solution of Nafion® perfluorosulfonic acid in a mixture of alcohols (e.g., Solution Technology, Inc.) is added to the suspension from the first stage, placed in a cooler and agitated, preferably sonicated, for between 2–30 minutes, depending on the particular mixture and ink volume. The cooler, e.g., an ice bath, is used to prevent overheating and to minimize evaporation of solvents, alcohols in particular, to maintain a consistent solution concentration. Nafion® solution is added in an amount required to obtain a Nafion® content in the dry catalyst of between 20% and 80% by volume of the dried catalyst. In most cases, the best performance of DMFC anodes is obtained with the recast ionomer content equal to 50%±10% (volume). An exemplary anode ink can be formed using 100 mg unsupported Pt—Ru catalyst 1:1 atomic ratio (Johnson Matthey), 800 mg water (purified), 350 mg 5% alcoholic solution of Nafion® EW 1200 (Solution Technology, Inc.).

Cathode Catalyst

The procedure for making cathode catalyst ink is similar to that for anode ink. Most commonly, the catalyst is an unsupported or supported Pt powder (e.g., Johnson Matthey, Alfa Aesar, E-Tek). As in the case of the anode ink preparation, in the first step, the required amount of a Pt catalyst is combined with purified water in an amount 4–20 times that of the catalyst (by weight) and agitated in a cooler, e.g., an ice bath, for 2–30 minutes until a homogenous suspension is obtained. Again, the optimum amount of water depends on the application technique to be used in preparing the MEA and is lower for brush painting and higher for spraying. The agitation time depends to some degree on the individual properties of the catalyst, with a 10-minute time sufficient in most cases where sonication is used.

In the second stage, a 5% (wt) solution of Nafion® perfluorosulfonic acid in an alcohol mixture (e.g., Solution Technology, Inc.) is added to the suspension from the first stage, placed in a cooler and agitated for between 2–30 minutes, depending on the individual mixture properties and ink volume. Sonication is the method of agitation and an ice bath is used for the cooler. The Nafion® solution is added in the amount needed to obtain between 20% and 80% by volume of recast Nafion® ionomer content in the dry catalyst layer. The best cathode performance was found with a 50%±10% (volume) recast ionomer content.

The effect of equivalent weight (EW) of Nafion® on the cathode activity was examined in the EW range from 900 to 1200, with Nafion®) EW 1200 providing slightly better performance than Nafion® EW 1100. An exemplary cathode ink can be formed using 100 mg Pt black catalyst (unsupported, Johnson Matthey), 800 mg water (purified), 220 mg 5% alcoholic solution of Nafion® EW 1200 (Solution Technology, Inc.).

The two-stage routine of DMFC ink preparation described above is one aspect of the present invention.

Ink Application

In order to prepare an MEA, the anode and cathode inks described above are applied to membranes, gas-diffusion electrodes (backings) or Teflon® decal blanks using either (i) brush painting or (ii) spraying (airbrush or ultrasonic).

Brush Painting

Depending on the selected method of MEA preparation, the painted surface is either the membrane itself, a gas diffusion electrode (backing) or a Teflon® decal blank. Painting of the same electrode in part on the backing and in part on the membrane was used in some cases.

Direct Application of Ink to the Membrane In this approach, a piece of an ionomeric membrane (usually Nafion® 117, but other membranes were also used) is placed on top of a porous stainless steel, low-vacuum, medium-flow-capacity vacuum table, heated to between 20–80° C. (most often to 60° C.). The vacuum table is used to hold the membrane in place and avoid wrinkling while painting. The elevated temperature helps adhesion of the ink and makes painting faster. A piece of reinforced Teflon® sheet, cut exactly to the size of active area of the MEA, is placed between the vacuum table and the membrane, directly under the area to be painted. The membrane is then masked with a sheet of thin silicone rubber with a window cut in it for the membrane area to be painted. In addition to limiting painting to the active area of the MEA, the silicone mask maintains a seal on the vacuum table.

Ink, either anode or cathode, is then applied to one side of the membrane using a regular camelhair brush of appropriate size for area to be painted (typical MEA sizes for DMFC research at LANL to date have been 5 or 45 cm$^2$). Special care is taken to apply ink uniformly and allow it to dry before painting another layer. Depending on ink viscosity and required catalyst loading, as many as 30 layers of ink have been applied per electrode. When painting of the first electrode is complete, the membrane is turned over and the other side is painted using the appropriate ink, i.e., if the first electrode is the cathode, then the other side is the anode. The ink vials are cooled in an ice bath during painting and capped whenever possible to minimize evaporation of solvents.

Applying numerous thin layers to achieve desired loadings is preferred to applying fewer thicker layers. The greater amount of solvent in thicker layers does not dry as quickly and is consequently absorbed by previously deposited catalyst layers and disrupts the catalyst structure resulting in "mud cracking", flaking-off and general loosening of the catalyst particles.

Upon completion of painting, the MEA is left on the heated vacuum table for 30 more minutes for the catalyst layers to cure. The MEA is then removed from the table and placed in a sealed plastic bag for future use.

Application of Ink to the Backing—Here, inks are applied to pieces of commercially available backing materials (typically different varieties of carbon cloth, but carbon paper also can be used). The inks and the brushes used are as described above. If necessary, the backing material is taped down to a piece of reinforced Teflon® sheet to prevent curling. The anode and the cathode inks are prepared on two separate pieces of backing, which are often different for the anode and cathode. The technique of ink application is very similar to the one already described, except that no heating of the substrate is used during painting. Instead, after painting every layer of ink, the piece of backing is placed in an electric oven and dried at a temperature between 60° C. and 125° C. Most often, a temperature near 120° C. is used to speed up drying. The time required for the ink to dry before next layer of catalyst can be applied is typically close to one minute at a higher oven temperature and increases correspondingly as lower temperature is used. At the final stage, the painted backing is cured in the oven for between 15 and 30 minutes.

Upon reaching a required catalyst loading, the painted pieces of anode and cathode backings are usually hot-pressed to the membrane. MEAs obtained by brush painting on the backing show performance comparable to that found with MEAs prepared by painting directly on membranes.

Application of Ink to Teflon® Decal Blanks—Inks are applied to pieces of Teflon® sheet cut to the size of the MEA active area. The inks and the brushes used are as described above. The anode and the cathode inks are applied to two separate Teflon® decal blanks for the anode and cathode. The technique of ink application is very similar to the one already described for the application to the backing, which includes multi-layer painting, oven-drying each layer and final curing. Upon reaching desired catalyst loading, the dried catalyst coat on the Teflon® decal blank is transferred to the ionomeric membrane by hot-pressing the "anode" and "cathode" decal blanks to either side of a membrane at 125° C.±25° C., 130–350 psi, for between 1 and 5 minutes, and then removing the Teflon® blank.

Spraying

Anode and cathode inks can be sprayed directly onto ionomeric membranes and backings or onto Teflon® decal blanks, later used to transfer catalyst to membranes.

Two spray approaches were compared, airbrush spraying and ultrasonic spraying. Spraying offers several important advantages:

Excellent uniformity of ink coat, especially important when very thin catalyst layers are desired, Faster ink application;

Easy automation;

Reduced loss of ink;

Effective break-up of agglomerated catalyst particles for maximizing accessible reaction sites (ultrasonic spraying);

Self-cleaning of the spray nozzle, allowing for very low ink flow rates (ultrasonic spraying).

Results to date show that the electrocatalytic activity of sprayed layers routinely corresponds to that of the best-performing MEAs among the large number fabricated by brush painting. Upon optimization, "sprayed" MEAs are expected to outperform those prepared by brush painting.

Airbrush spraying—In airbrush spraying, the fluid is drawn out of a reservoir into a spray gun by the flow of air or another carrier gas from either a compressor or gas cylinder (Venturi effect). Droplet size can be controlled by varying the size of the airbrush air cap, nozzle and tip, together with the pressure and flow rate of the carrier gas. Proper selection of the spraying conditions also depends on the viscosity of the fluid sprayed. Any fluid of the consistency of milk or thinner can usually be sprayed through an airbrush.

Catalyst inks are prepared the same as for brush painting, but typically require more water. The vial that contains ink is placed in an ice bath and connected to the airbrush via thin plastic tubing. During spraying, the ink is continuously sonicated using a ½-inch diameter ultrasonic probe penetrating the plastic cap of the vial. Without continuous sonication, the ink mixture tends to segregate into its components, the catalyst particles agglomerate, and the tubing and/or the spray nozzle eventually clog. MEAs are sprayed using a Paasche H Single-Action Airbrush with three differently sized nozzles, 1, 3 or 5, designed to accommodate inks of various viscosity and/or to atomize thinner inks faster. The intermediate nozzle (size 3) proved to be the most effective in most cases. The carrier gas is nitrogen from a pressurized cylinder, equipped in a regulator to control gas pressure and flow rate. The pressure is varied between 15 and 30 psig to provide slow, yet uninterrupted, flow of the ink to the airbrush.

When directly spraying onto an ionomeric membrane, the membrane is held in position on a vacuum table at between 50° C. and 100° C. and covered with a thin silicone rubber mask exposing the area to be sprayed.

FIG. 1 shows cell polarization plots for aqueous methanol/air fuel cell at 60° C. for a 5-cm$^2$: airbrush-sprayed MEA (solid circles), and one of the best ever 45-cm$^2$ brush-painted MEAs (open circles). Both MEAs were prepared by applying inks directly to the membrane and had a high total (anode plus cathode) Pt loading of 10 mg Pt cm$^{-2}$ for the spray and 12 mg Pt cm$^{-2}$ for the brushed solution. The sprayed-membrane cell used carbon- and Teflon®-treated anode cloth backing from E-Tek, whereas the brush-painted membrane used an untreated (more porous) anode backing. However, in the catalytically controlled domain, i.e., below an anode potential of 0.32 V at 60° C., the different backings have no effect on the cell performance. Therefore, the performance of both cells in this domain is directly comparable, regardless of the backings used.

At 60° C., performance of the airbrush-sprayed MEA is very similar to the best-performing MEAs obtained by brush painting. As shown in FIG. 1, in the range of low and intermediate current density, in the catalytically controlled domain of cell operation, the sprayed MEA exhibits somewhat higher DMFC activity than the top-performing brush-painted MEA with a similar total catalyst content.

Figure 2:
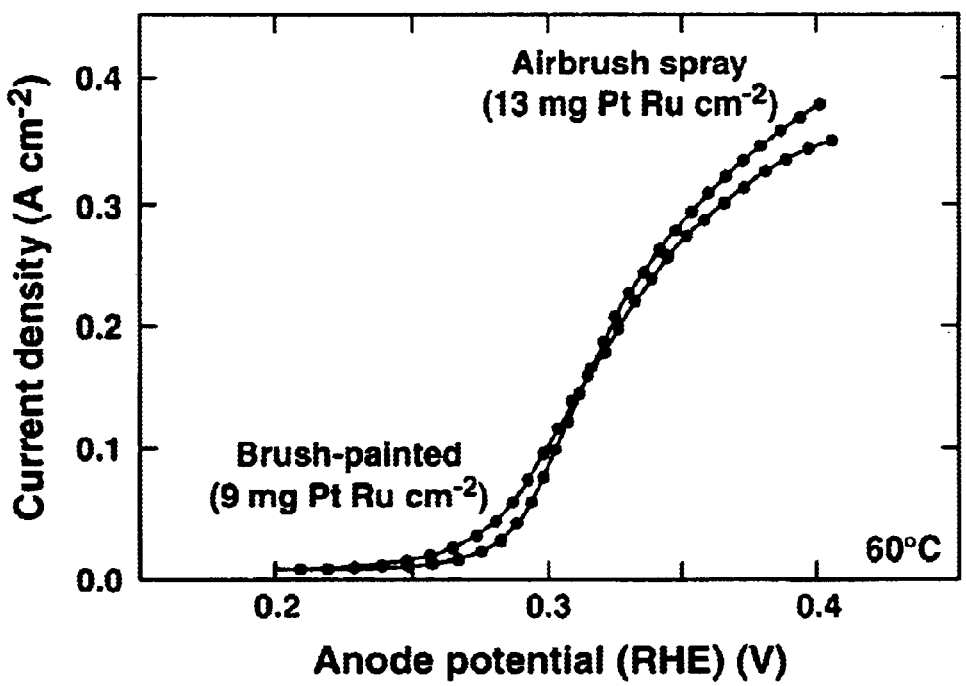
FIG. 2 graphically depicts anode polarization of an airbrush sprayed MEA and one of the best brush-painted MEAs at high Pt—Ru loading.

FIG. 2 shows anode polarization plots for the two cells compared in FIG. 1. Both anodes had a high Pt—Ru catalyst loading of 13 mg Pt—Ru cm$^{-2}$ for the spray and 9 mg Pt—Ru cm$^{-2}$ for the brushed-painted MEA.

In FIG. 2, iR-corrected anode polarization plots for the cells shown in FIG. 1 exhibit comparable activity of both anodes. Anode response is very good, with a current density at 0.35 V (typical reference potential for anode comparison) reaching ca. 0.2 A cm$^{-2}$ at 60° C.

Figure 3:
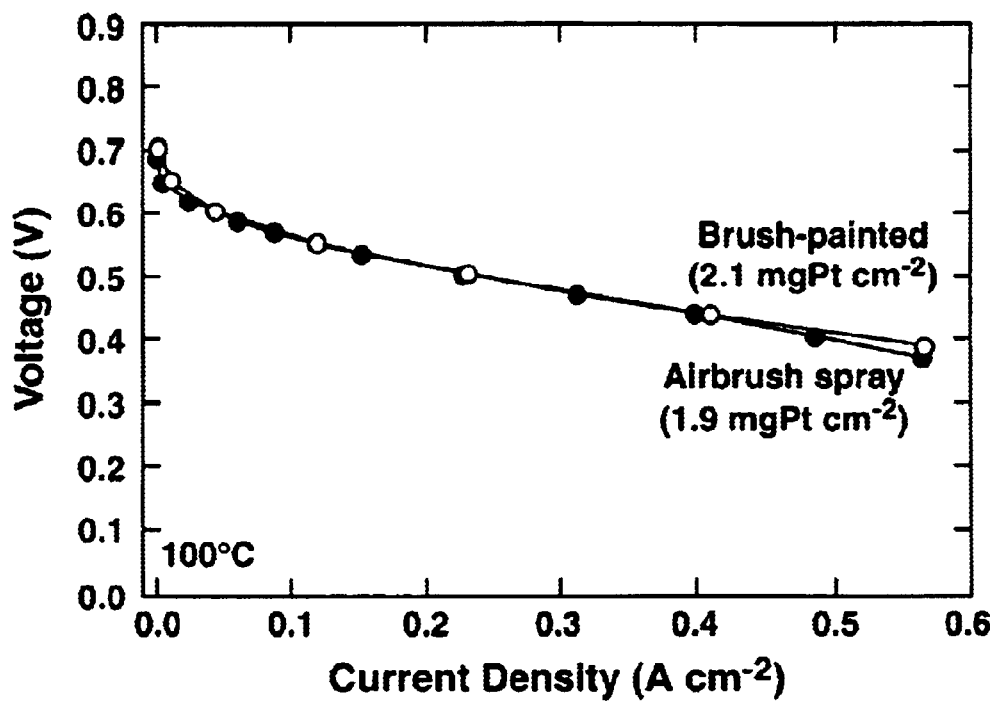
FIG. 3 graphically depicts cell polarization of an airbrush sprayed MEA and one of the best brush-painted MEAs at low total Pt loading.

FIG. 3 shows cell polarization plots in the catalytically controlled domain at 100° C. for a 45-cm$^2$ airbrush-sprayed MEA (solid circles) and the best ever 5-cm² brush-painted MEA with low catalyst loading (open circles). Both MEAs were prepared by applying inks directly to the membrane. A low total Pt loading of 1.9 mg Pt cm⁻² was used for the spray and 2.1 mg Pt cm⁻² for the brush applied solution.

Figure 4:
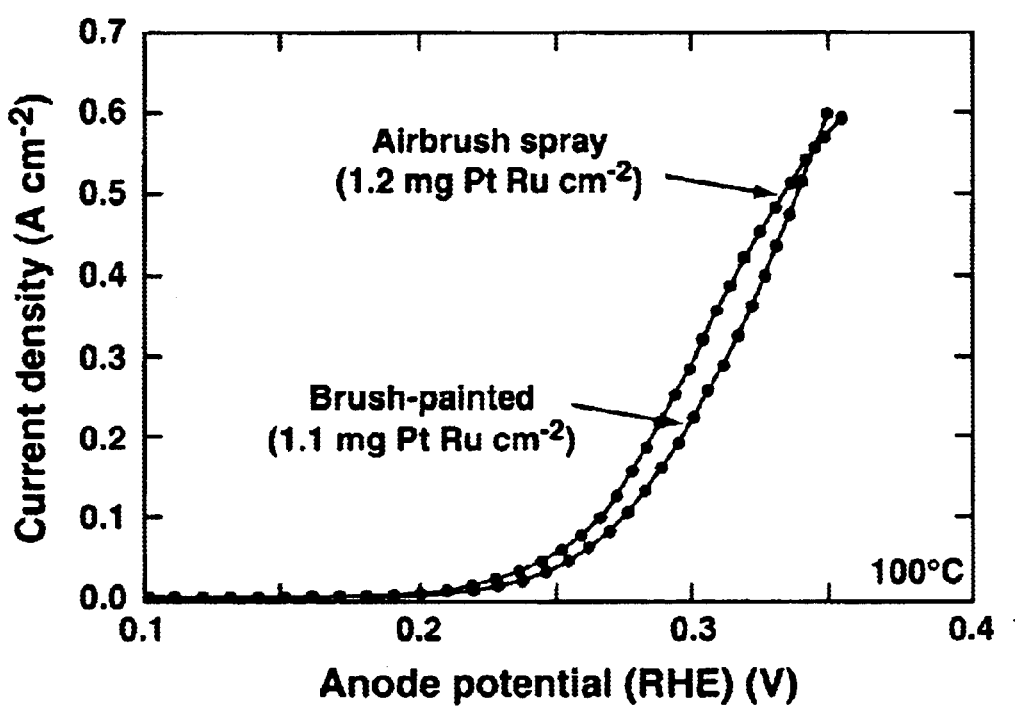
FIG. 4 graphically depicts anode polarization of an airbrush sprayed MEA and one of the best brush-painted MEAs at low Pt—Ru loading.

FIG. 4 shows anode polarization plots at 100° C. for a 45-cm² airbrush-sprayed and the best ever 5-cm² brush-painted MEA (the same cells as in FIG. 3). A low anode catalyst loading was used in both cases: 1.2 mg Pt—Ru cm⁻² for the airbrush-sprayed and 1.1 mg Pt—Ru cm⁻² for the brush-painted MEAs.

Airbrush spraying is particularly effective for the preparation of MEAs with lower catalyst loading. Cell polarization plots shown in FIG. 3 were obtained at 100° C. with total Pt loading of 1.9 and 2.1 mg cm⁻² for the "airbrush" and "brush-painted" cells, respectively. The performance of both cells is practically identical up to a current density of 0.5 A cm⁻². Anode polarization plots in FIG. 4 show that the current density of methanol oxidation at the airbrush-sprayed anode, in the catalytically controlled domain (anode potentials below ca. 0.32 V for 100° C.), is noticeably higher than the activity of the similarly loaded brush-painted anode. At a potential of 0.3 V, the enhancement in activity achieved by airbrush spraying reaches ca. 30%.

Ultrasonic Spraying—During ultrasonic spraying, agglomerated particles/constituents of a fluid are broken up and very small droplets are produced (median size range typically 20–70 $\mu$m). This results in a very fine spray with small uniform particles. Depending on the nature of the liquid being sprayed and the desired drop size, the flow rate of the spray can be as little as a few $\mu$L per second. Drop size is governed by the frequency at which the ultrasonic spray nozzle vibrates, allowing the user to select a drop size range for their needs.

The ultrasonic spray system for MEA fabrication incorporates a 60-kHz Sono-Tek Corporation ultrasonic spray nozzle with broadband ultrasonic generator, a gas pressurized reservoir or low-flow peristaltic pump ink delivery system, a gas shroud around the spray nozzle for directing the spray onto the substrate, and a movable, heated vacuum table, which holds the ionomeric membrane to be sprayed.

During spraying, the reservoir holding the ink is continuously sonicated (10–20% on-time duty cycle) by a ½ inch diameter ultrasonic probe and cooled in an ice bath. Sonication prevents the ink from segregating and catalyst particles from agglomerating.

With the pressurized-reservoir ink delivery system, the pressurizing gas is typically delivered to the reservoir at 10–15 psig and the flow is controlled with a needle valve or tube-crimping device during spraying. A flow rate of 0.2–2.0 mL min⁻¹ is used, depending on the area being sprayed and desired loading. With the peristaltic ink delivery system, the ink is drawn from the reservoir and delivered at flow rates specified above.

The ultrasonic spray is directed with a focused gas stream. This gives momentum to the spray, directing it onto the membrane being held by the vacuum table. The gas flow used depends on the ink flow and ultrasonic nozzle height above substrate.

A few MEAs were made with the prototype ultrasonic spray system. During spraying, the vacuum table was moved manually back and forth beneath the spray nozzle in a regular and repeatable manner to obtain a uniform spray over the 45-cm² MEA. The movement of the vacuum table is now performed using a computer controlled X-Y positioning.

Figure 5:
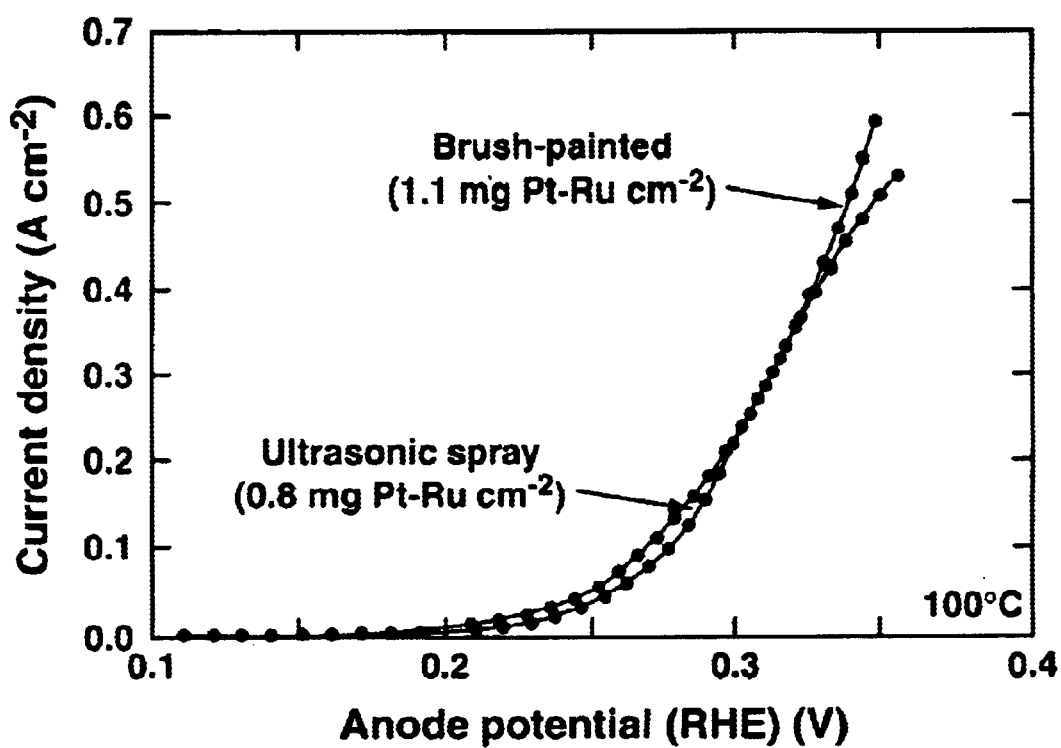
FIG. 5 graphically depicts anode polarization of an ultrasonically-sprayed MEA and one of the best brush-painted MEAs at low Pt—Ru loading.

FIG. 5 shows anode polarization plots at 100° C. for a 45-cm² ultrasonic-sprayed MEA and the best ever 5-cm² brush-painted MEA. Both MEAs were prepared by applying inks directly to the membrane. A low Pt—Ru anode catalyst loading was used with 0.89 mg Pt—Ru cm⁻² for the spray and 1.1 mg Pt—Ru cm⁻² for the brushed solution.

As in the case of airbrush-sprayed MEAs, discussed above, the results were compared to the best-performing MEA prepared by brush painting. Comparison of these plots immediately reveals that, despite a lower Pt—Ru loading, the sprayed anode actually performs better than the brush-painted anode in the catalytically controlled domain of anode potentials.

Summarizing, initial test data of an MEA prepared by ultrasonic spraying of the anode and the cathode catalysts onto Nafion 117 membrane suggest superior DMFC performance. In addition, full automation of the spraying process should enhance rapid and efficient fabrication of uniform MEAs.

Spraying is an effective method of MEA preparation for both low and high temperature DMFC operation. The method may be particularly important for achieving good reproducibility of low-catalyst-loading MEAs. Once fully automated, the spraying technique should greatly facilitate large-scale fabrication of membrane-electrode assemblies for DMFCs.

The foregoing description of the invention has been presented for purposes of illustration and description and is not intended to be exhaustive or to limit the invention to the precise form disclosed, and obviously many modifications and variations are possible in light of the above teaching. The embodiment were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for making inks for use in anode and cathode catalysts applied to membranes for a direct methanol fuel cells comprising:

combining a catalyst selected from the group consisting of Pt and Pt—Ru catalysts with purified water to form a first mixture;

cooling the first mixture to a temperature that reduces evaporation of water from the first mixture;

placing the first mixture in a cooler and agitating the first mixture to obtain a first homogeneous suspension;

adding an alcoholic solution of perfluorosulfonic acid to the first homogeneous suspension to provide a second mixture;

agitating the second mixture in the cooler to obtain a homogeneous ink suitable for application to the appropriate anode or cathode side of the membrane.

2. The method of claim 1, wherein the water in the first mixture is in an amount of 4–20 times the weight of the Pt or Pt—Ru catalyst.

3. The method of claim 1, wherein the first and second mixtures are agitated by sonication.

4. The method of claim 1, where the first and second mixtures are cooled by an ice bath.

5. The method of claim 1, where perfluorosulfonic acid is added in an amount effective to provide an ionomer content in the anode and cathode surfaces of 20% to 80% by volume.

* * * * *